No. 716,455. Patented Dec. 23, 1902.
L. L. MERRIFIELD.
METHOD OF PRODUCING GAS FROM PEAT.
(Application filed June 24, 1901. Renewed Nov. 21, 1902.)

(No Model.) 3 Sheets—Sheet I.

No. 716,455. Patented Dec. 23, 1902.
L. L. MERRIFIELD.
METHOD OF PRODUCING GAS FROM PEAT.
(Application filed June 24, 1901. Renewed Nov. 21, 1902.)

(No Model.) 3 Sheets—Sheet 2.

No. 716,455. Patented Dec. 23, 1902.
L. L. MERRIFIELD.
METHOD OF PRODUCING GAS FROM PEAT.
(Application filed June 24, 1901. Renewed Nov. 21, 1902.)

(No Model.) 3 Sheets—Sheet 3.

Witnesses.
H. J. S. Lenny
R. Shields

Inventor.
L. L. Merrifield
by Featherstonhaugh
Atty.

UNITED STATES PATENT OFFICE.

LEONARD LANCASTER MERRIFIELD, OF TORONTO, CANADA, ASSIGNOR TO EDWIN JAMES CHECKLEY AND ECONOMICAL GAS APPARATUS CONSTRUCTION COMPANY, LIMITED, OF TORONTO, CANADA, A CORPORATION OF CANADA.

METHOD OF PRODUCING GAS FROM PEAT.

SPECIFICATION forming part of Letters Patent No. 716,455, dated December 23, 1902.

Application filed June 24, 1901. Renewed November 21, 1902. Serial No. 132,297. (No specimens.)

*To all whom it may concern:*

Be it known that I, LEONARD LANCASTER MERRIFIELD, mechanical engineer, of the city of Toronto, in the county of York, in the Province of Ontario, Canada, have invented a certain new and useful Improved Method of Producing Gas from Peat and other Organic Substances, of which the following is a specification.

My invention relates to an improved process or method for producing gas from peat, sawdust, and other organic substances; and the object of the invention is to devise an improved process whereby that portion of the gas which is non-combustible is converted into combustible gases, and thereby materially increase the amount of combustibles in the resultant gases; and such process consists in the mode of treatment which I shall presently describe.

Figure 1:
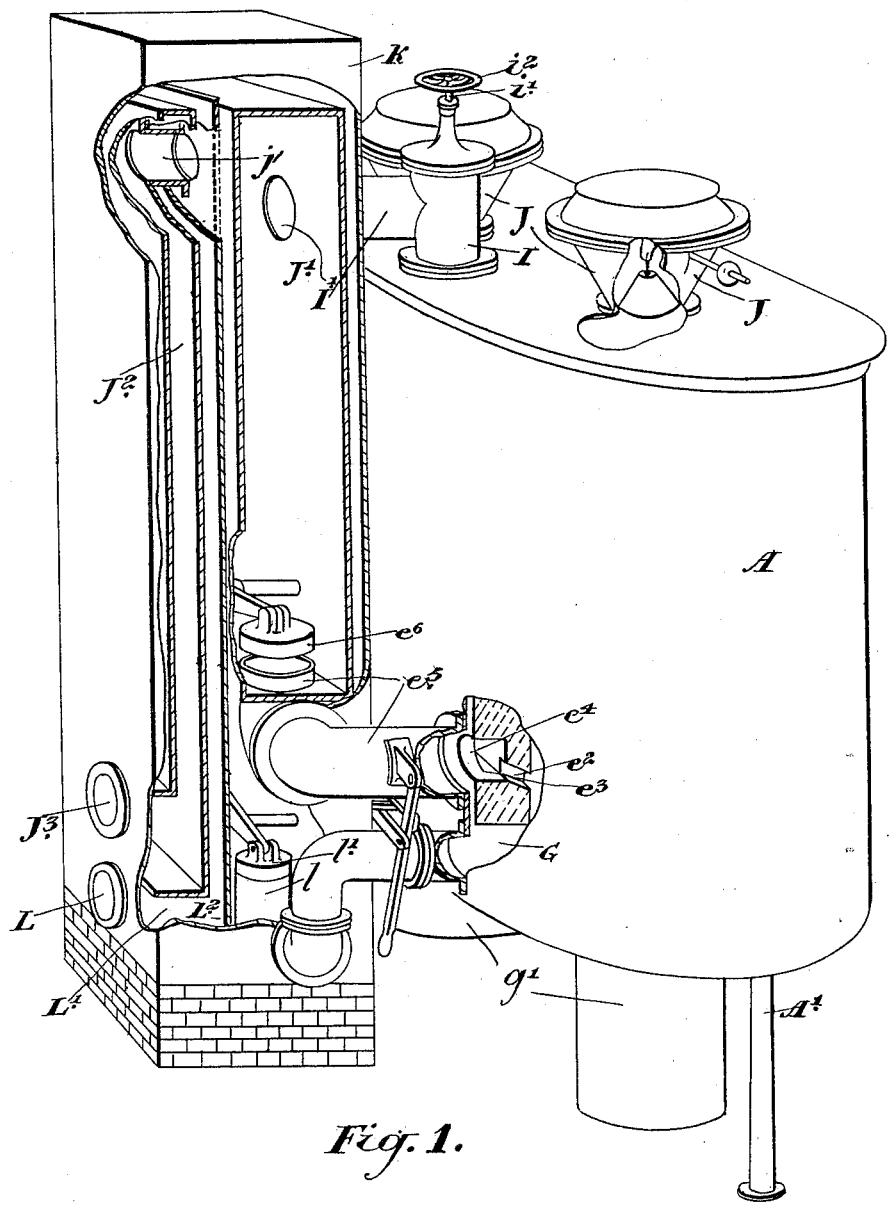
Figure 2:
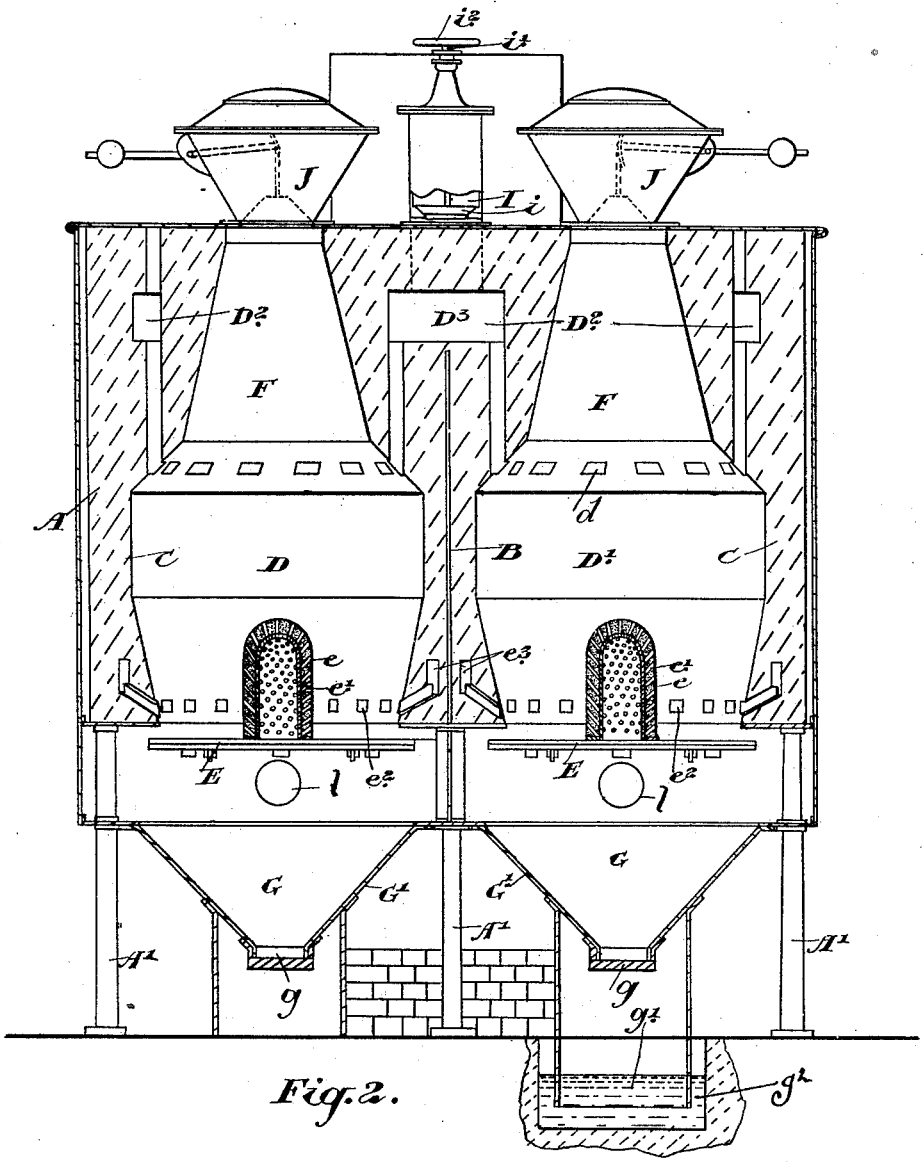
Figure 3:
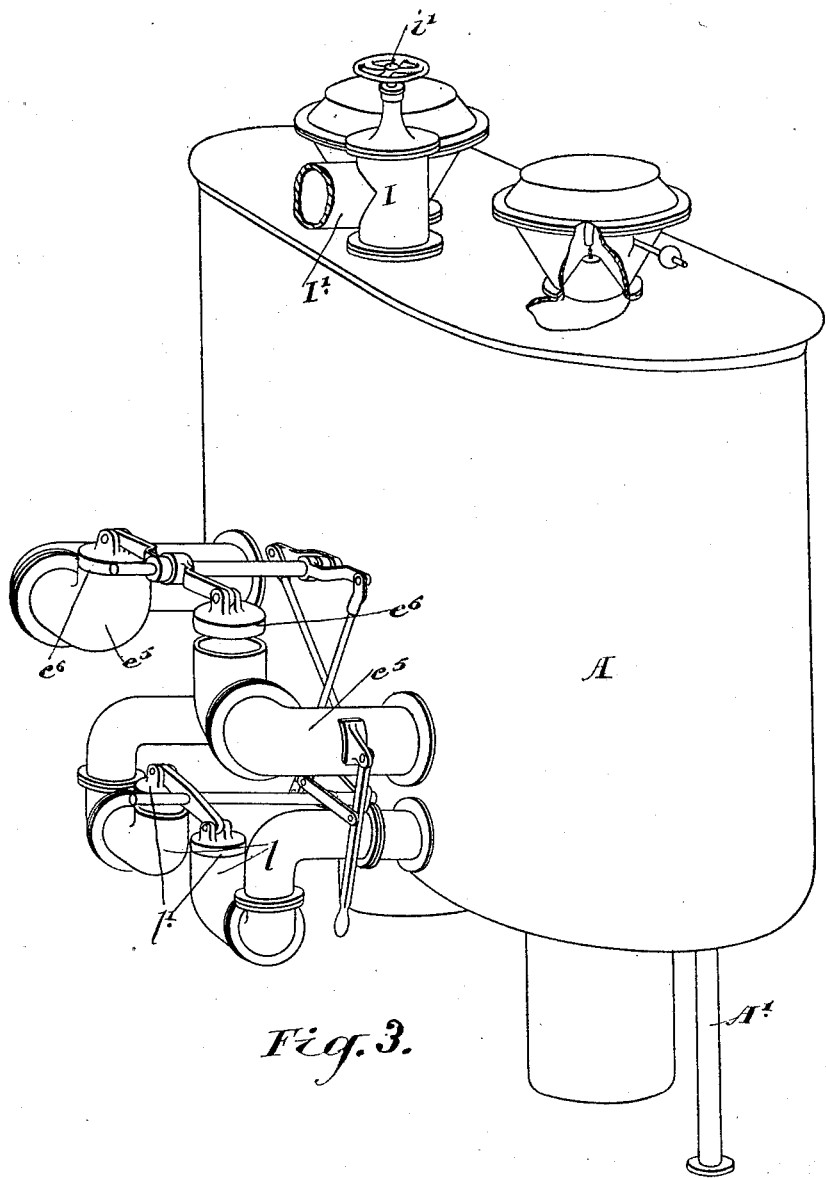

Figure 1 is a perspective view, partially from the rear, showing the general form of my gas-machine, portion of the casing being broken away to exhibit the mechanism. Fig. 2 is a vertical section looking from the front. Fig. 3 is a perspective view of the producers with the vertical flues omitted to show the arrangement and working of the valves more clearly.

In the drawings like letters of reference indicate corresponding parts in each figure.

A is the shell of the machine, and B a central partition.

C is the lining of fire-brick, which is so formed as to form two chambers D D' of equal area, at the bottom of which are located the grates E E. Each of the chambers D D' has located above it a retort F, which is in the form of a frustum of a cone. It will be noticed that the lower portions of the chambers D D' are tapered, as shown. It will be noticed also that the ash-pit G has a substantially conical bottom G', provided with a suitable valve $g$, the chute $g'$ of which extends into a water seal $g^2$. The shell is supported on suitable hollow standards A'. The grates E are revolving grates and are provided with the central perforated dome $e$, covered with fire clay or bricks $e'$, also provided with perforations. These perforations serve to keep the bed of peat at the bottom of the grate incandescent, as will hereinafter appear.

Surrounding the chambers D D' at the bottom are a series of passage-ways $e^2$, extending radially outwardly into an annular chamber $e^3$. These passage-ways are designed to convey the gas from the bottom of the chamber to the conduit leading to the main, as will hereinafter appear. At the inwardly extending or tapered upper portion of the chamber D', I provide a series of openings or passage-ways $d$, which extend vertically upwardly into annular chambers $D^2$, which are connected together at the top by a cross passage-way $D^3$, into which extends the gas-outlet flue I. The outlet-flue I is provided with a suitable valve $i$, which is manipulated through the valve-stem $i'$ and handle $i^2$.

J represents suitable charging-hoppers at the top, which are made in any suitable manner, such as may be found most convenient and suitable.

It will be noticed on reference to Fig. 1 that the outlet-flue I is connected at the top by the branch I' with the conduit J', which is located and supported in the main rectangular chamber K. It will also be noticed that I provide a passage-way $e^4$ at the back of each chamber D, which communicates with the outlet-pipes $e^5$, which in turn communicate with the conduit J', being provided, however, at the top or end with a cap $e^6$, which may be opened or closed, as the occasion may require, the cap shown in the drawings, however, being open.

The conduit J' connects by means of a pipe $j'$ with a conduit $J^2$, at the bottom of which is an opening $J^3$, to which is connected a pipe for conducting gas to any desired point.

L is an opening leading into a fresh-air conduit L', which extends around the conduit $J^2$, and central partition $L^2$ around the conduit J' and down to the bottom thereof, whence it passes through by the pipe $l$ into the bottom of the ash-pit immediately below the grate. The outer end of each conduit $l$ is provided with a cap $l'$, as indicated in Figs. 1 and 3. It will now be seen that there are practically two pipes for the admission of the fresh air into the bottoms of the retorts and two pipes for the outlet of gas from the bottom portions of the retorts, and the first two pipes are provided with caps $l'$ and the latter with caps $e^6$. One outlet-pipe only is shown, as also one inlet-pipe for the air. It will of course be understood that on the opposite side of the casing K there are corresponding pipes and also valves or caps $e^6$ and $l'$. The cap $l'$ on one side is always opened simultaneously with the cap $e^6$ on the opposite side, so that the draft through the pipe $l'$ on the one side passes up through the incandescent peat and carries the gas down through the passage-ways $e^2$ and outlet-pipe $e^5$ on the opposite side.

I shall not describe the working of the valves, as it is not necessary for the understanding of my process. I shall, however, first describe the manner of starting the fire, so that the process or method may be practiced. The chambers D and D' are filled with peat fuel or sawdust or other organic substances up to about a point slightly above the gas-outlet $d$. Fire is then kindled in both chambers and the caps $l'$ are adjusted so as to be raised and open, while the caps $e^6$ close the pipes $e^5$, as hereinbefore described. When the fuel in the chambers D and D' is brought to a proper degree of temperature—viz., that of incandescence—one cap $e^6$ is then opened by suitable mechanism to operate simultaneously with the cap $l'$ on the other side—that is to say, the two diagonally-situated caps of the gas-outlet and draft-inlet pipes are then arranged to act in unison. It will thus be seen that when the cap $e^6$ is open, so as to uncover the pipe $e^5$, the diagonally-situated cap $l'$ is also open so as to uncover the pipe $l$. A forced draft by any suitable means created is preferably used and forced through the pipe $l$ into the bottom of the chamber D', the gas from the incandescent peat being thereby forced through the passage-ways $d$ and cross passage-ways $D^3$ and annular passage-ways $D^2$ through the passage-way $d$ at the opposite side, whence the gas passes down through the second bed of incandescent peat and out through the gas-openings $e^3$ into the pipe $e^5$, thence out through the conduits $J'$ and $J^2$ to the main gas-supply pipe.

In order to keep the bed of peat in each chamber incandescent, it is necessary to frequently change the valves or caps, closing the draft and gas-outlet pipes, which work in unison to throw the caps which are closed open and the caps which are open closed. The main draft thus would be directed through the adjacent chamber in identically the same manner and down through the opposite chamber by the passage-ways hereinbefore referred to, thence through the outlet-pipe. Not only may the air be admitted through the pipe L, but also steam may be admitted through this pipe and the air and steam passing through the grate E and perforated cone into the fuel, where partial combustion takes place, the resultant gases, with portion of the moisture in the peat, passing up through the flues or passage-ways, as hereinbefore described. I find in practice it is necessary to change the position of the valves or caps for the pipes $e^5$ and $l$ frequently to produce the best effects. It will thus be seen from this description that my process consists in bringing two bodies of peat in a suitable chamber to a state of incandescence and then causing a draft to pass and carry the gas produced from the one body of incandescent peat through suitable passage-ways down through another body of incandescent peat held in a suitable chamber, the gas then passing out through conduits which are surrounded or are adjacent to intake-conduits in which the fresh air is introduced at the bottom of the chamber, so as to produce the draft. It will now be clearly understood that the heated gas as it passes out has the result of heating the air passing into the retort, which is an important desideratum.

It will be noticed that by introducing the peat in the conical retorts F F and surrounding such retorts by passage-ways through which the heated gas passes I am enabled to eliminate a great deal of moisture in the peat rawly fed which is in the retorts F F. It will be of course understood there is a constant supply of peat in the retorts, so as to keep them practically full.

The reversing of the direction of the draft through the chambers is governed by the amount of carbon dioxid in the resultant gases, and the change is made at such periods that the temperature of the coke in the second chamber is always kept sufficiently high to decompose the tarry matter, and the flames due to the oxidation of the gases in the first chamber bring the fuel to a bright-red heat, and in the descent of the gases through the incandescent-carbon column in the second chamber the carbon dioxid is converted into carbon monoxid and the water-vapors into carbon monoxid and hydrogen. The peat or carbonaceous material is fed in onto the top of both fuel-beds in the generators, and as the escape of the gases is below the upper surface of each incandescent fuel-bed any dust or dirt introduced cannot be carried forward into the flues, and therefore no tar or water-vapors can escape from the generator. In my method also it will be seen that the gas is generated in one chamber and passes out from such chamber at the point between the non-incandescent carbonaceous material and the incandescent carbonaceous material, thence into the adjacent chamber at the same point—that is, between the non-incandescent carbonaceous material and the incandescent material—thus the taking of excessive moisture from the non-incandescent carbonaceous material is avoided, as would otherwise be the case were the gas to pass through the non-incandescent carbonaceous material. Such moisture as is taken is carried from the one chamber into the other and forms hydrogen. By the method I employ $CO_2$ is converted into CO. It will also be understood in my method that the feeding-hoppers are kept supplied all the time by any suitable continuous feed and that the moist material at the bottom of the feeding-retort will necessarily contain very much less moisture than at the top of the retort, and consequently will have little or no effect in cooling the incandescent body, beneath which it is important to keep it at as high a degree of temperature as is possible.

The clinker and uncombustible matter gradually falls to the base of the fuel, where they are removed by a shaking or revolving grate and fall into the hopper-bottom, which is provided with a valve, as described, where they give up all the sensible heat to the incoming air and steam, and from the hopper-bottom drop from time to time through the valve into the water seal and after the valve is closed can be withdrawn without stopping the production of gas. These generators permit of peat and wood sawdust or bituminous-coal slake or shales to be employed to make gas for gas-machines, gas-stoves, and furnaces and remove the difficulty of flue-deposits of carbon and tar, the common associates of every single gas-producer.

After a great deal of experiment I have found that I am enabled to practically eliminate the carbonic-acid and water-vapors or non-combustible gas, or, more properly, to convert them into carbonic oxid and hydrogen, which passes out through the flue into the preheating device, hereinbefore described, where the sensible heat of the gas is taken up by the air which surrounds the flues and travels in the opposite direction, the gas passing through the outlet $J^3$ to washers, scrubbers, condensers, or gas-holders or where required.

What I claim as my invention is—

1. The herein-described process of making gas from peat, and similar material containing an excess of moisture, which consists in feeding the said material into a suitable producer, raising the material in the lower part of the producer to incandescence, thereby vaporizing the excess of moisture of the fresh supplies in the upper part of the producer, drawing off all the gas and vaporized moisture from a point between the freshly-fed fuel and the incandescent material, substantially as described.

2. The herein-described process of making gas from peat and similar material, containing an excess of moisture which consists in feeding the said material to a suitable producer, raising the material in the lower part to incandescence, thereby vaporizing the excess of moisture of the fresh supplies introduced into the upper part, drawing off all gas and the vaporized moisture from a point between the freshly-fed fuel and the incandescent fuel, and conveying the mixture through a body of incandescent material, substantially as described.

3. The herein-described process of making gas from peat and similar material containing an excess of moisture, which consists in feeding the said material to a pair of connected producers, raising the material in the lower parts of said producers to incandescence, thereby vaporizing the excess of moisture of the fresh supplies in the upper part of both of the producers, drawing off all the gas and the vaporized moisture from points between the freshly-fed fuel and the incandescent material, and conveying the mixture through the incandescent material only in the second producer, and then reversing the operation, substantially as described.

LEONARD LANCASTER MERRIFIELD.

Witnesses:
L. TRIMBLE,
R. SHIELDS.